United States Patent [19]

Pryor et al.

[11] 3,948,432

[45] Apr. 6, 1976

[54] BRAZING PREFORMS AND METHOD OF BRAZING

[75] Inventors: Michael J. Pryor, Woodbridge; Stanley Shapiro, New Haven; Derek E. Tyler, Cheshire; John Shabarack, Branford, all of Conn.

[73] Assignee: Olin Corporation, New Haven, Conn.

[22] Filed: Sept. 26, 1974

[21] Appl. No.: 509,412

Related U.S. Application Data

[63] Continuation-in-part of Ser. No. 303,649, Nov. 3, 1972, which is a continuation of Ser. No. 120,741, March 3, 1971, abandoned.

[52] U.S. Cl. ............... 228/223; 228/254; 228/263; 228/238; 75/161
[51] Int. Cl.² ............... B23K 1/04; B23K 35/30
[58] Field of Search ........... 228/263, 223, 238, 254; 75/161

[56] References Cited

UNITED STATES PATENTS

| 1,892,607 | 12/1932 | Bundy | 228/254 X |
|---|---|---|---|
| 2,646,620 | 7/1953 | Geddes et al. | 228/223 X |
| 2,712,175 | 7/1955 | Stark | 228/263 X |
| 3,079,252 | 2/1963 | Webb et al. | 75/161 X |
| 3,134,669 | 5/1964 | de Putter et al. | 75/161 |
| 3,197,859 | 8/1965 | Cape | 228/263 X |
| 3,323,913 | 6/1967 | Bosman | 75/161 X |
| 3,693,246 | 9/1972 | Novikov et al. | 75/161 X |

FOREIGN PATENTS OR APPLICATIONS

| 1,183,692 | 12/1964 | Germany | 75/157.5 |
|---|---|---|---|
| 137,386 | 5/1960 | U.S.S.R. | 75/161 |
| 128,271 | 2/1959 | U.S.S.R. | 75/161 |

*Primary Examiner*—James L. Jones, Jr.
*Assistant Examiner*—K. J. Ramsey
*Attorney, Agent, or Firm*—David A. Jackson; Robert H. Bachman

[57] ABSTRACT

Brazing preforms are disclosed which may take the form of wire, sheet or strip, and which are useful for joining copper, ferrous and nickel base alloys. The preforms of this invention are prepared from an alloy which contains manganese from 22 to 40%, iron from 0.1 to 2%, aluminum from 0.1 to 5%, zinc from 2 to 10%, balance essentially copper. A method of brazing is also disclosed which may be performed with or without a flux, and which is conducted in an inert atmosphere, at a temperature of from about 900° to 1100°C. The brazed products of this invention possess reduced brittleness and improved resistance to corrosion.

16 Claims, No Drawings

BRAZING PREFORMS AND METHOD OF BRAZING

CROSS-REFERENCE TO RELATED APPLICATIONS

This is a continuation-In-part of application Ser. No. 303,649, filed Nov. 3, 1972, which is in turn a continuation of application Ser. No. 120,741, filed Mar. 3, 1971, now abandoned.

BACKGROUND OF THE INVENTION

This invention relates to novel, low cost, brazing preforms, and a method of brazing employed with them. This invention also relates to high strength copper base alloys which may be readily prepared into said preforms to join metal and alloys by the brazing process. Due to the low melting point of these alloys, the resultant brazed joints attain high strength.

For many years the metals industry has used various copper base alloys as brazing media to join other metals and alloys for such applications as electrical motor parts, electrical bus bars, water piping, and tubing systems in air conditioning and refrigeration equipment. The most commonly used filler alloys include the copper-phosphorus alloys, and copper-zinc alloys. The former alloys have low melting points and are brazed at temperatures of 635° to 850°C, while the latter alloys possess higher melting points and are brazed at temperatures of 870° to 950°C.

Concerning the copper-phosphorus alloys, the amount of phosphorus that must be added to copper to sufficiently lower the melting point to a temperature suitable for brazing has a severe embrittling effect on the copper. Thus, these alloys are brittle and can only be fabricated in a limited manner by working when the metal is hot. They are too brittle to be cold worked to any appreciable extent. Thus, they frequently must be applied in a powdered form. Furthermore, the brittle characteristics tend to be carried over to the finished brazed joints made with these alloys. Hence, the copper-phosphorus alloys are limited to use with specific copper base alloys and cannot be used to join ferrous or nickel base alloys.

The copper-zinc brazing alloys containing 40 to 50% zinc, are difficult to fabricate, especially by cold working, because of the beta phase associated with this high zinc content. These alloys possess higher melting points than the foregoing copper-phosphorus alloys and thus must be heated to 870° to 950°C to effect adequate flow into a brazed joint. Extreme caution is necessary to prevent extensive vaporization of zinc from the molten metal, and subsequent void formation in the joint through entrapment of zinc vapor. Because of their poor corrosion and stress corrosion, these alloys find only restricted use to join selected copper base alloys, and stainless steels.

Accordingly, therefore, it is an object of the present invention to provide novel low cost alloys that may be readily and economically fabricated by hot and cold working techniques, into brazing preforms such as thin sheet, strip, or wire, which may be utilized as a media to join copper, ferrous and nickel base alloys by the brazing process.

It is a further object of the present invention to provide brazing preforms which are useful at reduced brazing temperatures and which do not exhibit embrittlement in the resulting brazed joint.

It is a still further object of the present invention to provide sound brazed joints which inherit the high strength, corrosion and stress corrosion characteristics of the filler alloy.

Further objects and advantages of the present invention will appear from the ensuing specification.

SUMMARY OF THE INVENTION

In accordance with the present invention, the foregoing objects and advantages may be readily obtained.

The brazing preforms of the present invention are prepared from white copper alloys consisting essentially of manganese from 22 to 40%, iron from 0.1 to 2%, aluminum from 0.1 to 5%, zinc from 2 to 10%, balance essentially copper.

The alloys of the present invention are considered low cost since each of the alloying ingredients are readily available and inexpensive, and since their total addition to the copper matrix may vary from about 24 to 57%. Likewise, none of the alloying ingredients have any serious embrittling effects, and the instant alloys may be readily fabricated into the various preforms by hot and cold processing techniques.

The alloys of the present invention also possess other highly desirable characteristics. They have relatively high strengths, in either annealed or temper rolled conditions, which are superior to the phosphor bronze and nickel silver alloys currently utilized for applications, such as for high strength springs. In addition, the alloys of the present invention possess excellent corrosion and stress corrosion characteristics, superior to phosphor bronzes, nickel silvers and beryllium-copper alloys.

The addition of manganese to copper in the alloys of the present invention has the remarkable effect of lowering the liquidus temperature, and simultaneously decreasing the temperature range between the liquidus and solidus, such that with additions of manganese, an azeotrope is observed at approximately 32% manganese. Generally, the alloys tend to possess a solidus temperature of about 877°C and a liquidus temperature of about 890°C. This azeotrope results in the low melting point which comprises one of the advantages of the preforms of this invention and renders them particularly suitable as media for joining other metals and alloys by the brazing process.

In addition to the foregoing, the preforms of the present invention are white in color, and, therefore, are particularly useful for brazing white alloys. In view of their relatively low zinc contents, the alloys of the present invention do not tend to dezincify when molten, during the brazing process.

DETAILED DESCRIPTION OF THE PREFERRED EMBODIMENTS

As indicated hereinabove, the brazing preforms of the present invention contain a large proportion of low cost ingredients and are thus inexpensively prepared. The alloys of this invention are desirably white in color, and possess strengths as high as 140,000 psi. They are also formable into a variety of shapes, and exhibit excellent corrosion and stress corrosion resistance. Furthermore, because of their relatively low melting point, they are highly useful as brazing materials, as sound high strength joints may be successfully made by brazing at temperatures of 900° to 1100°C. Additionally, their white color makes them particularly suitable for brazing other white copper and ferrous alloys.

The alloys of the present invention are essentially all alpha phase solid solution alloys containing finely and uniformly dispersed second phases which impart refined grain size and added strength to the alloys. This fine dispersion of particles also retards recrystallization of the cold rolled alloys, such that even with anneals as high as 650°C grain size less than 0.010 mm. may be retained.

The alloys of the present invention contain manganese in an amount from 22 to 40% by weight, preferably 25 to 35% and optimally from 28 to 32%. The zinc is from 2 to 10% and preferably from 3 to 5%. The aluminum is present in an amount from 0.1 to 5% and preferably from 0.5 to 3.5%. The iron content is from 0.1 to 2% and preferably from 0.5 to 1.5%.

As indicated hereinabove, the copper-manganese phase diagram is characterized by the occurrence of an azeotrope, i.e., a particular alloy composition wherein the liquidus and solidus temperatures are coincident. The alloys of the present invention contain manganese contents that encompass this azeotrope, and, as illustrated earlier, generally tend to possess fairly close solidus and liquidus temperatures. Thus, the high manganese additions impart desirably low melting points, and narrow freezing ranges, that render the alloys particularly suitable for brazing.

Difficulties are frequently encountered in the melting and casting of copper alloys containing high proportions of manganese due to their susceptibility to absorb gases, such as hydrogen, nitrogen, etc. The solubility of such gaseous elements is relatively high in the liquid phase, but relatively insoluble in the solid. Thus, on solidification these gases tend to become entrapped in the alloys creating undesirably high porosity. It has been found in the present invention that the addition of zinc, in amounts of 2 to 10%, and preferably 3 to 5%, to the molten alloys effectively reduces the solubility of these gases, thus degassing the alloys, and minimizing and often eliminating porosity in the solid casting.

Further difficulties are often encountered in the melting and casting of copper-manganese alloys containing a high proportion of manganese, due to the tenacious and gummy oxide slag that forms over the molten liquid. It has been found that in the alloys of the present invention the problem may be adequately overcome by the additions of 0.1 to 5% aluminum, and preferably 0.5 to 3.5%. This addition reduces the manganese oxide in the slag, forming a thin and powdery layer. The slag so formed is more readily manageable during casting, and surface defects due to inclusion of slag are minimized.

The addition of iron in the alloys of this invention form together with the aluminum, intermetallic phases that become finely and uniformly dispersed throughout the alloy during subsequent processing. This fine particle dispersion retards recrystallization and grain growth, and thus imparts a very fine grain size. In addition, they contribute to the high strength of the alloys.

Naturally, the present invention contemplates the use of alloys containing small amounts of additional ingredients to achieve particular results. In general less than 5% of each of one or more of the following materials may be added, and preferably less than 3% each: lead; tin; silicon; cobalt; magnesium; and nickel. Phosphorus, arsenic, antimony, lithium and boron may be added up to 0.3% and preferably less than 0.1%.

Small amounts of the foregoing alloying additions may be readily used, if desired, for example, 0.001% each.

Further, the alloys of the present invention may also contain common impurities, for example, up to 0.05% each, total 0.25%.

Throughout the instant specification all percentages are weight percentages.

The alloys of the present invention are readily prepared and processed, and are normally cast from the molten state at a melt temperature of from 900° to 1050°C. It should be understood that the melt temperature is the temperature of the melt immediately before being subjected to cooling during solidification.

The alloys of this invention are preferably cast by the direct chill or DC casting method. This method is highly advantageous as it increases output by reducing required casting time. It has surprisingly been found that the alloys of this invention are capable of being successfully DC cast, despite their characteritically low thermal conductivity and high fluidity.

In the melting step, it is preferred to submerge the manganese in order to prevent heavy loss of manganese by preferential oxidation. This may be accomplished by following the manganese addition immediately by the addition of more copper.

Following the casting step, the material may be readily hot worked at temperatures between 700° and 850°C and preferably between 750° and 800°C.

The alloy may be cleaned, cold rolled and annealed in the conventional manner to the final desired gauge. The preferred annealing temperature range is from 500° to 800°C, for at least 15 minutes and generally for from 1 to 4 hours, and the alloy may be readily cold rolled, in excess of 80% between interanneals. These characteristics may be advantageously utilized to process the alloys to the thin gauge sheet or wire suitable for brazing applications which comprise the brazing preforms of this invention.

It should be understood that after annealing the alloy may be also cold rolled to a variety of hard tempers suitable for other desired application. Naturally, similar properties are obtainable when the cold work is put in by deep drawing or other suitable cold working operations.

The advantages of the alloys of the present invention will be more readily understandable from a consideration of the following examples.

EXAMPLE I

An alloy of the present invention was prepared using DC casting with a pouring temperature of 1000°C. The casting was done under a charcoal cover and the alloy had the following composition: manganese 30%, zinc 4%, iron 1%, aluminum 0.5%, balance essentially copper. The alloy prepared was processed in the following manner. The alloy was hot rolled from 3 inches to 0.35 inch from 800°C, cold rolled to 0.100 inch and annealed for 1 hour at various temperatures. The resultant properties are shown in Tables I and II below. Table I represents the annealed properties and Table II represents the cold rolled properties from 0.100 inch gauge after annealing for 1 hour at 625°C.

TABLE I

| Anneal | Annealed Properties | | | | |
|---|---|---|---|---|---|
| | Tensile Strength (ksi) | Yield Strength (.2% Offset) (ksi) | Elong. (%) | Hardness ($R_B$) | Grain Size (mm) |
| 600°C/1 hr | 90.0 | 62.0 | 21.0 | 84 | <.010 |
| 700°C/1 hr | 75.0 | 32.0 | 30.0 | 53 | .020 |
| 750°C/1 hr | 70.0 | 28.0 | 34.0 | 47 | .045 |

TABLE II

| Cold Work, % | Cold Rolled Properties | | | | |
|---|---|---|---|---|---|
| | Tensile Strength (ksi) | Yield Strength (.2% Offset) (ksi) | Elong. (%) | Hardness ($R_B$) | Grain Size (mm) |
| 0 | 85.0 | 56.0 | 25.0 | 78 | .010 |
| 40 | 121.0 | 117.0 | 3.0 | 100 | — |
| 70 | 130.0 | 125.0 | 2.5 | 104 | — |

EXAMPLE II

An alloy of the present invention was prepared and processed in the same manner as in Example I. The alloy had the following composition: manganese 30%, iron 1%, aluminum 3%, zinc 4%, balance essentially copper. The annealed and cold rolled properties are shown in Tables III and IV below. The cold rolled properties were determined from 0.100 inch gauge after a 1 hour anneal at 700°C.

TABLE III

| Annealing Treatment | Annealed Properties | | | | |
|---|---|---|---|---|---|
| | Tensile Strength (ksi) | Yield Strength (.2% Offset) (ksi) | Elong. (%) | Hardness ($R_B$) | Grain Size (mm) |
| 700°C/1 hr | 94.0 | 40.5 | 30.5 | 74 | .010 |
| 750°C/1 hr | 86.0 | 35.0 | 33.0 | 65 | .040 |

TABLE IV

| Cold Work, % | Cold Rolled Properties | | | | |
|---|---|---|---|---|---|
| | Tensile Strength (ksi) | Yield Strength (.2% Offset) (ksi) | Elong. (%) | Hardness ($R_B$) | Grain Size (mm) |
| 0 | 94.0 | 40.5 | 30.5 | 74 | .010 |
| 40 | 109.0 | 105.0 | 3.0 | 96 | — |
| 70 | 120.5 | 116.0 | 1.5 | 101 | — |

EXAMPLE III

As a comparative example, CDA Alloy 510 was prepared having the following composition: lead about 0.05%, iron about 0.10%, tin about 5%, zinc about 0.30%, phosphorus about 0.1%, balance essentially copper. The alloy was DC cast in a manner after Example I. The material was hot rolled, then cold rolled with intermediate anneals to 0.045 inch gauge, annealed for 1 hour at 500°C and cold rolled to 0.022 inch gauge. The annealed and cold rolled properties are shown in Tables V and VI below. The cold rolled properties were determined after an RF anneal of 1 hour at 500°C at 0.46 inch gauge.

TABLE V

| One Hour At Temperature | Annealed Properties | | | |
|---|---|---|---|---|
| | Tensile Strength (ksi) | Yield Strength (.2% Offset) (ksi) | Elongation Percent | Grain Size (mm) |
| 500°C | 55.0 | 28.0 | 56 | .015 |
| 600°C | 49.0 | 24.0 | 60 | .030 |
| 700°C | 46.0 | 20.0 | 64 | .080 |

TABLE VI

| Cold Work, % | Cold Rolled Properties | | | |
|---|---|---|---|---|
| | Tensile Strength (ksi) | Yield Strength (.2% Offset) (ksi) | Elongation Percent | Grain Size (mm) |
| 0 | 55.0 | 28.0 | 56 | .015 |
| 40 | 93.0 | 88.0 | 7 | — |
| 70 | 115.0 | 110.0 | 2 | — |

EXAMPLE IV

As a further comparative example, CDA Alloy 762, a nickel silver alloy was DC cast in a manner after Example I. The alloy had the following composition: nickel, 12%; zinc, 29%, balance essentially copper. The alloy was hot rolled and then cold rolled to 0.100 inch gauge. The annealed and cold rolled properties of the alloy are shown in Tables VII and VIII below. The cold rolled properties were determined after an RF anneal of 1 hour at 600°C at 0.100 inch gauge.

TABLE VII

| One Hour At Temperature | Annealed Properties | | | |
|---|---|---|---|---|
| | Tensile Strength (ksi) | Yield Strength (.2% Offset) (ksi) | Elongation Percent | Grain Size (mm) |
| 500°C | 69.0 | 39.0 | 40 | .010 |
| 600°C | 62.0 | 29.0 | 47 | .020 |
| 700°C | 57.0 | 21.0 | 49 | .060 |

TABLE VIII

| Cold Work, % | Cold Rolled Properties | | | |
|---|---|---|---|---|
| | Tensile Strength (ksi) | Yield Strength (.2% Offset) (ksi) | Elongation Percent | Grain Size (mm) |
| 0 | 62 | 29 | 47 | .020 |
| 40 | 97 | 89 | 4 | — |
| 70 | 118 | 106 | 1 | — |

As noted earlier, the preforms of this invention may vary in shape and may assume, for example, the form of sheet, strip or wire. It is to be understood, however, that the invention is not intended to be limited thereby, as an endless variety of shapes may be prepared which are specifically suited to certain brazing operations.

The method of this invention comprises providing a brazing preform prepared from the alloy disclosed above, which contains from 22 to 40% manganese, from 0.1 to 2% iron, from 0.1 to 5% aluminum, from 2 to 10% zinc, and the balance copper. The method is useful for the joining of copper, ferrous and nickel base alloys, and may be practiced with or without the use of a brazing flux. If a brazing flux is desired, conventional fluxes may be employed such as are well known in the art. Thus, for example, such fluxes as the alkali metal halides, the metal halide salts, various organic compounds and the like are suitable for employment within the scope of this invention.

The method of this invention may also be practiced without the use of a flux. One may merely employ a non-oxidizing atmosphere, which may be provided by an inert gas such as welding argon, nitrogen of commercial purity, forming gas or ammonia. A mixture which has been found to be particularly useful comprises nitrogen and hydrogen in a 96:4 ratio.

The brazing operation may advantageously be conducted at temperatures ranging from 900°–1100°C, due to the melting point of the brazing preforms. The operation should extend for a period of time sufficient to thoroughly melt the preform and allow the filler metal to flow throughout and thereby sufficiently contact the area to be joined. Of course, this time period would vary with the nature, size, etc., of the brazing operation contemplated, and would, therefore, be determinable in each instance within the skill of the art.

After completion of the above heat treatment, the brazed area is then allowed to cool to solidify the filler metal. If a flux is used, it may be desirable to wash the assembly to remove any flux residue. This can be accomplished by simple immersion in a water bath or by flushing with tap water.

The following examples are presented to illustrate the application of this invention to a brazing operation.

EXAMPLE V

A foil approximately 0.005 inch thick of the alloy of Example I was prepared by alternate cold reductions and anneals. Utilizing this foil, test pieces of type 304 stainless steel (composition approximately: carbon, 0.05%; chromium, 19% nickel, 9%; balance essentially iron) were furnace brazed in an inert atmosphere at approximately 930°C. The brazing time was approximately 5 minutes. Similar brazements were made wherein the base metal was copper alloy 194 (composition approximately: iron, 2.3%; phosphorus, 0.03%; zinc, 0.12%; balance essentially copper). The resultant properties of these brazements are shown in Table IX below.

TABLE IX

| Parent Metal | Shear Strength of Brazement (psi) | Tensile Strength of Brazement (psi) |
|---|---|---|
| 304 SS | 36,300 | 59,300 |
| CDA 194 | 25,700 | 37,800 |

EXAMPLE VI

A foil approximately 0.005 inch thick of the alloy of Example II was prepared by alternate cold reductions and anneals. Utilizing this foil, test pieces of type 304 stainless steel were furnace brazed in an inert atmosphere at approximately 930°C. The brazing time was approximately 5 minutes. Similar brazements were made wherein the base metal was copper alloy 194. The resultant properties of these brazements are shown in Table X below.

TABLE X

| Parent Metal | Shear Strength of Brazement (psi) | Tensile Strength of Brazement (psi) |
|---|---|---|
| 304 SS | 32,200 | 50,600 |
| CDA 194 | 23,900 | 36,100 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method of joining metal members by brazing which comprises:
   A. providing a brazing preform prepared from an alloy consisting of manganese from 22 to 40%, iron from 0.1 to 2%, aluminum from 0.1 to 5%, zinc from 2 to 10%, balance copper;
   B. bringing said metal members into joining relationship at at least one joining site and disposing said preform thereat to form a brazing assembly;
   C. heating said assembly to brazing temperature;
   D. holding the assembly at said brazing temperature for a period of time sufficient to allow said preform to melt and thereby wet and join said metal members in a brazed joint; and
   E. allowing said joint to solidify.

2. The method of claim 1 wherein said metal members are brought into joining relationship at more than one joining site.

3. The method of claim 1 wherein a welding flux is employed.

4. The method of claim 3 wherein said flux comprises an aqueous bath and said metal members are immersed therein before being brought into joining relationship.

5. The method of claim 4 wherein immersion in said aqueous bath is conducted after the formation of said assembly.

6. The method of claim 5 wherein said assembly is dried immediately after immersion in said bath.

7. The method of claim 4 wherein said members are dried immediately after immersion in said bath.

8. The method of claim 1 wherein brazing temperature ranges from about 900° to about 1100°C.

9. The method of claim 1 wherein said heating step is conducted in a non-oxidizing atmosphere.

10. The method of claim 9 wherein said non-oxidizing atmosphere comprises an inert gas.

11. The method of claim 1 wherein said alloy contains manganese in an amount from 28 to 32%.

12. The method of claim 1 wherein said alloy contains iron in an amount of 0.5 to 1.5%.

13. The method of claim 1 wherein said alloy contains aluminum in an amount from 0.5 to 3.5%.

14. The method of claim 1 wherein said alloy contains zinc in an amount from 3 to 5%.

15. The method of claim 1 wherein said alloy consists of manganese from 25 to 35%, iron from 0.5 to 1.5%, aluminum from 0.5 to 3.5%, zinc from 3 to 5%, balance copper.

16. The method of claim 1 wherein said preform is disposed as a surface cladding on at least one of said metal members.

* * * * *